US010695596B2

(12) United States Patent
Paglioli et al.

(10) Patent No.: US 10,695,596 B2
(45) Date of Patent: Jun. 30, 2020

(54) DEVICE FOR BRAKING THE FALL OF A LOAD

(71) Applicant: ALUDESIGN S.P.A., Cisano Bergamasco BG (IT)

(72) Inventors: Carlo Paglioli, Cisano Bergamasco (IT); Stefano Forni, Cisano Bergamasco (IT)

(73) Assignee: ALUDESIGN S.P.A., Cisano Bergamasco (IT)

( * ) Notice: Subject to any disclaimer, the term of this patent is extended or adjusted under 35 U.S.C. 154(b) by 0 days.

(21) Appl. No.: 16/324,552

(22) PCT Filed: Feb. 1, 2018

(86) PCT No.: PCT/IB2018/050630
§ 371 (c)(1),
(2) Date: Feb. 9, 2019

(87) PCT Pub. No.: WO2018/142319
PCT Pub. Date: Aug. 9, 2018

(65) Prior Publication Data
US 2019/0175963 A1   Jun. 13, 2019

(30) Foreign Application Priority Data
Feb. 2, 2017  (IT) .................. 102017000011637

(51) Int. Cl.
*A62B 1/20*   (2006.01)
*A62B 35/04*  (2006.01)
(Continued)

(52) U.S. Cl.
CPC .......... *A62B 35/04* (2013.01); *A62B 35/0075* (2013.01); *B64D 17/36* (2013.01); *F16F 7/006* (2013.01); *F16F 7/08* (2013.01)

(58) Field of Classification Search
CPC .... A62B 35/04; A62B 35/0075; B64D 17/36; F16F 7/006; F16F 7/08
(Continued)

(56) References Cited

U.S. PATENT DOCUMENTS 3,444,957 A * 5/1969 Ervin, Jr. .................. F16F 7/00
                                                      182/3
4,100,996 A * 7/1978 Sharp .................... A62B 35/04
                                                      182/3

(Continued)

FOREIGN PATENT DOCUMENTS

EP   1389481    2/2004
GB    572727   10/1945
(Continued)

OTHER PUBLICATIONS

International search report and written opinion dated Apr. 16, 2018 for corresponding PCT patent application No. PCT/IB2018/050630.
(Continued)

*Primary Examiner* — Todd M Epps
(74) *Attorney, Agent, or Firm* — Silvia Salvadori

(57) ABSTRACT

A device (1) is described for braking the fall of a load comprising a sling (2) and a braking element (3, 30), said sling (2) comprising a first end (21) constrainable to an anchoring point; a second end (22) constrainable to said load; a folded section (23) comprising a first portion (23*a*) of said sling (2) reversibly joined to a second portion (23*b*) of said sling (2), said folded section (23) providing a resistance to the separation of said first and second portions (23*a*, 23*b*). The sling further comprises a first free section (24) comprised between said first portion (23*a*) of said folded section (23) and said first end (21); and a second free section (25) comprised between said second portion (23*b*) of said folded section (23) and said second end (22). The braking element (3, 30) comprises a plurality of passages for
(Continued)

said sling (2), said first free section (24) crossing at least one first passage (3a), said second free section (25) crossing at least one second passage (3b), so that said first portion (23a), as a consequence of the application of a traction force (FT, FT') higher than a threshold value to at least one of said two ends (21, 22), separates from said second portion (23b) and crosses said first passage (3a), and said second portion 23b crosses said second passage (3b).

15 Claims, 9 Drawing Sheets

(51) Int. Cl.
*F16F 7/00* (2006.01)
*B64D 17/36* (2006.01)
*A62B 35/00* (2006.01)
*F16F 7/08* (2006.01)

(58) Field of Classification Search
USPC .......................... 248/636; 182/3, 4, 192, 193
See application file for complete search history.

(56) References Cited

U.S. PATENT DOCUMENTS

| | | | |
|---|---|---|---|
| 4,618,026 A * | 10/1986 | Olson ................... | A62B 35/04 182/4 |
| 5,145,036 A * | 9/1992 | Omalia ................... | A62B 1/04 182/193 |
| 5,295,559 A * | 3/1994 | Nutkins ................... | B66D 5/16 182/191 |
| 6,131,697 A * | 10/2000 | Bassett ................... | A62B 1/04 182/192 |

FOREIGN PATENT DOCUMENTS

| | | |
|---|---|---|
| WO | 9213601 | 8/1992 |
| WO | 9501815 | 1/1995 |
| WO | 2007134746 | 11/2007 |

OTHER PUBLICATIONS

International Preliminary report on patentability dated Aug. 6, 2019 for corresponding PCT patent application No. PCT/IB2018/050630.
Priority Search Report dated Sep. 20, 2017 for Italian priority application No. IT102017000011637.

* cited by examiner

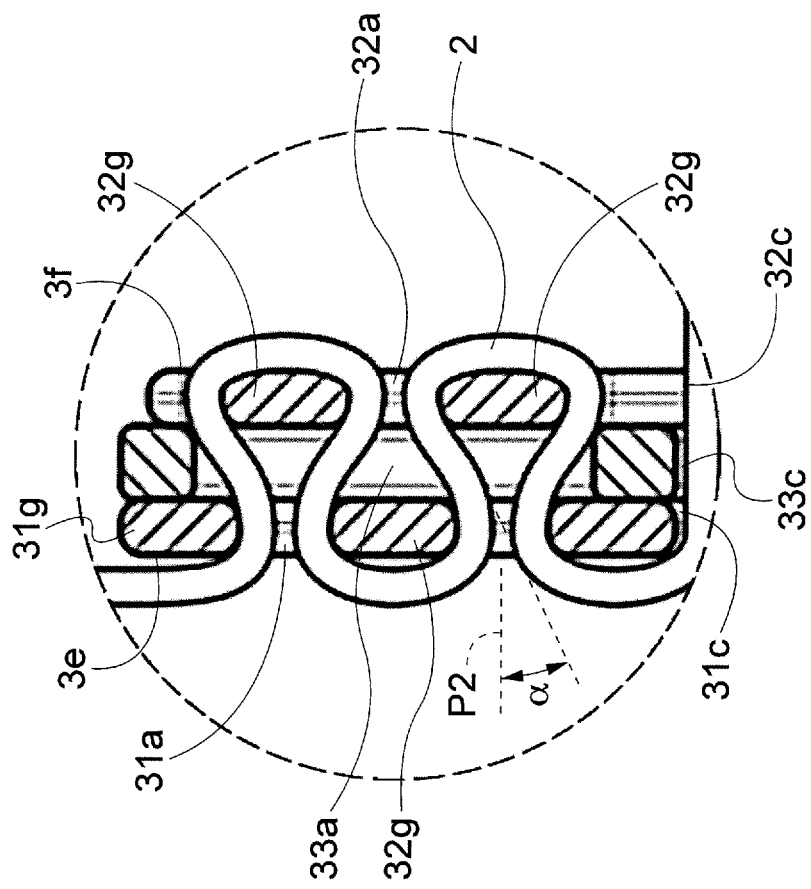
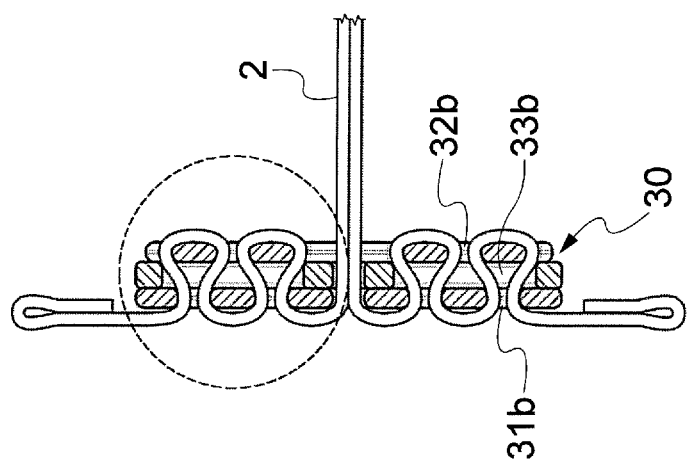

DEVICE FOR BRAKING THE FALL OF A LOAD

This application is a U.S. national stage of PCT/IB2018/050630 filed on 1 Feb. 2018, which claims priority to and the benefit of Italian Application No. 102017000011637 filed on 2 Feb. 2017, the contents of which are incorporated herein by reference in their entireties.

FIELD OF THE INVENTION

The present invention relates to a device for braking the fall of a load, typically for braking the fall of a person. More in detail, the present invention relates to a device for braking the fall by energy dissipation.

It has to be immediately noted that the reference to the braking of the fall is herein meant to denote the possibility of stopping the fall. More in detail, the term "braking" and the phrase "device for braking the fall" are herein used to indicate that the device object of the invention slows down the fall of a load, typically a person, by energy dissipation, leading to the fall arrest.

BACKGROUND ART

Such devices are also known in the art as dissipating brakes, or energy absorbers. Such devices will be hereafter also referred to just using the term "dissipator".

In mountaineering, or while working at a certain height and the like, it is possible that a fall occurs. Devices for braking/arresting the fall are known, for example by means of wire ropes provided with a connector getting in bulk against a stop. However, such systems cause sudden decelerations and high peaks of stress.

In order to solve such a problem, devices are known in the art that allow the energy absorption, specifically operating by friction or tearing, and serve to absorb and dissipate the energy built up during the fall.

An example of friction absorber, wherein the energy is dissipated into heat, is disclosed in EP1389481 wherein a cable is forced to slide along a given path, or in U.S. Pat. No. 4,100,996 wherein a sling slides in a sort of buckle.

An example of tear absorber is on the contrary described in the document U.S. Pat. No. 3,444,957, wherein the energy of the fall is dissipated by addressing it to open and move away, by tearing them, proper seams which couple the slings.

Generally, tear dissipators have a failure at an established load, based on the type of seams. The threshold level for the opening of the seams applied on this type of dissipators is such to absorb, at each tear, a certain amount of energy, while allowing the falling body losing altitude.

An aspect to be specifically taken into account is the deceleration the body is subjected to during the fall slowing down. Various studies showed that a person eligible tolerance level is at most 6-9 g of deceleration. If this value is exceeded, there is a major risk of causing eye, brain, spinal and bowel damages, due to sudden slowdown and to the associated pressure which is generated on body backbone or soft parts.

On the other hand, in order to limit the whole fall length, partially originating by the elongation extent of the absorber, there is the tendency to implement high strength seams, so as to immediately dissipate a certain amount of energy and therefore limit the length of the fall.

The dissipator elongation is a function of the energy to be dissipated during the fall. In order to brake a heavy body, for example of 120 kg, falling from a certain height, a remarkable amount of energy has to be dissipated. On the contrary, in order to brake a lightweight body, for example a child weighing 40 kg falling from the same height, a remarkably lower energy has to be dissipated.

As the first seams are teared, the fall energy begins to be dissipated and this carries on until the fall residual energy is not able to tear additional seams. It is easy to understand thus how, the fall height being the same, a lightweight body tears a lower number of seams compared to those teared by a heavier body.

By comparing the fall of lightweight and heavy bodies, given a determined dissipator and being the falling speed independent of the body weight, the fall of the lightweight body will be braked in a smaller space, and thus more suddenly, with respect to what would happen for the heaviest body. Such a deceleration can also become much higher than 9 g. This can thus cause remarkable and relevant physical damages to the lightweight person. In the opposite case, but with similar final effect, a particularly heavy person falling with a device calibrated for lightweights, would easily tear all the seams and would suddenly weight with his own residual energy, and his speed, on the dissipator stop, thus in turn being subjected to strong deceleration.

In order to solve such drawbacks, gradual dissipation devices are further known in the art, i.e. having several stages such to decelerate falls of both lightweight and heavy people, by the same device.

Such a device is described for example in U.S. Pat. No. 7,392,881, wherein by a particular implementation of the sling, after a certain tear length, teared branches are doubled. Neither such solutions completely solve the problem of causing large brakes, and thus decelerations, for some loads.

Consider, for example, as absorber provided with three sets of seams respectively calibrated for braking loads of 40 kg, 80 kg and 120 kg. In other words, consider an absorber wherein a load of 40 kg only tears a first stage of seams, a load of 80 kg tears the first two stages of seams, and a load of 120 kg tears the three stages of the dissipator. However, considering a load slightly larger than one of the afore mentioned stages, for example 45 kg, this wholly tears the first stage, and undergoes to a very sudden deceleration, even much higher than 9 g, next to the beginning of the second stage, this being calibrated for a 80 kg load.

From here the need of providing an absorber that highly gradually dissipates forces and is less prone to sudden resistance differences of the different seams.

Furthermore, it has to be taken into account that, in order to support such loads, the seams of such absorbers have to be made with particularly strong yarns and very numerous stitches. The presence of such stitches could weaken the yarn strength; in fact, during the implementation of the stitches, a needle is used carrying out repeated passages that can cause fiber degradation. Furthermore, since strong yarns are crossed by a lot of seams, the slings of such absorbers are highly bulky and stiff, thus difficult to use, in addition they are particularly expensive to be implemented.

In the case of dissipators operating by friction it has furthermore been ascertained that brakings can be significantly affected by the textile fiber aging over time, which fiber becoming stiffened, highly increases its braking potential and thus amplifies the problem of the sudden deceleration. Thus, it is unwanted to obtain the braking function through friction devices and with marked blockages of the textile fiber.

In view of the foregoing, an object of the present invention is to implement a device for braking the fall, which is suitable for slowing down the fall of a wide range of users, having variable weights.

Additional object of the present invention is to implement a device for braking a fall, which is simple and cheap to be implemented, and which is reliable at the same time.

SUMMARY OF THE INVENTION

This and other objects are obtained by the present invention by means of a device according to claim 1. Other aspects and characteristics of the device are stated in the dependent claims.

According to an embodiment, the device for braking the fall of a load, preferably a person, according to the present invention comprises a sling and a braking element cooperating with the same sling.

In turn, the sling comprises a first end constrainable to a support point, for example an anchoring point, a second end constrainable to the load, for example a person, and a folded section comprising a first portion of the sling reversibly joined to a second portion of the sling.

The folded portion provides resistance to the separation of the two reversibly joined portions. Furthermore, the sling comprises a first free section comprised between the first portion of the folded section and the first end, and a second free section comprised between the second portion of the folded section and the second end.

The braking element of the device is provided with a plurality of passages for the sling, and the first free section crosses at least one first passage, while the second free section crosses at least one second passage.

In particular, upon the application of a force higher than a certain threshold (threshold value) to the two ends, the first portion separates from the second portion and crosses the first passage, while the second portion crosses the second passage.

It has to be observed that the threshold value is defined at least by the resistance to the separation of the first portion and the second portion of the sling and by the friction between the braking element and the sling.

In other words, the force applied to the sling, which is enough to cause the separation of the first and second portions, has to be higher than the combined action of the resistance to the separation of the first and second portions and the friction generated between the braking element and the sling sliding and contacting the same.

The force reaching the first and second portions of the sling next to their joining region or area (for example by means of seaming) is lower than the one applied to the ends of the sling, just because of the friction generated between the braking element and the same sling.

More in detail, when a force (i.e. a load) is applied to an end of the sling, this is "reduced" when reaches the folded section due to amplified braking generated by the combined and synergistic action of the mentioned resistance to separation and the friction coefficient of the braking element. In other words, at least part of the force applied to the end(s) of the sling is countered by the friction between the braking element and the sling, such that the folded section is subjected to a smaller (i.e. "reduced") force with respect to the force applied on the sling itself.

In case such a "reduced" force reaching the first and second portions of the sling, at the portion wherein they are joined, is higher than the mentioned resistance to separation, the separation of the mentioned sling portions occurs.

Therefore, even applying to the sling end a force higher (for example slightly higher) than the resistance to the separation of the sling portions, such portions could not separate, since the friction between the braking element and the sling counters at least partially the applied force, and thus the "reduced" force (i.e. the difference between the applied force and the resistance induced by the friction) becomes lower than the resistance to the separation between the sling portions. Thus, in order to cause the separation of the sling portions, both the resistance to the separation of the portions and the braking device friction which, as mentioned, operate synergistically, have to be overcome.

Furthermore, such a separation is implemented by the "reduced" force applied to the sling portions, and not by diaphragms or other elements moving away or opening the portions or tearing the seams, which could significantly modify and affect the force useful to generate the afore said resistance, thus impairing the amplified dissipating function. Specifically, when the sling crosses one of the mentioned passages, this is contacting the braking element, therefore a friction force between sling and braking element is caused. Thanks to the present invention, as just afore mentioned, during the fall of a load, the sling is taut so as to mostly adhere to the braking element. Furthermore, the presence of the folded section further increases the strain on the sling, which preferably counters the sliding of the free sections of the sling inside the passages of the braking element. Thanks to this, it has been verified that the amplifying effect of the braking force given by the combined and synergistic action of the mentioned resistance to separation and the friction of the braking element, and thus not by the simple sum of the forces resisting to the separation together with the forces of friction of the sling on the braking element, can be used advantageously.

Thereby the force resulting by the amplifying effect is significantly higher than the sum of the single forces, and this allows a significant downsizing of dimensions and complexity of the absorbing system.

In order to better clarify what mentioned, it has to be taken into account that the experiments carried out during the development of the invention highlighted that, for example, a folded section having resistance to the separation equal to about 0.25 kN, coupled with a braking element able to generate a friction resistance equal to about 0.65 kN, is able to develop a whole restraining force up to 4.5 kN, thus well over the sum of the two separated effects.

Thanks to that, a folded portion with limited resistance to separation can be used, thus allowing the sling thickness being kept reduced, which is simply implemented and easy to be used.

According to an aspect of the present invention, the folded section comprises a plurality of sectors, wherein the portions are reversibly joined to one another, and the sectors have resistances to separation different from one another.

Thanks to that, the device braking action can be progressively and gradually varied, for example gradually increased.

According to another aspect of the present invention, the portions of the folded section are joined to one another by at least one seam.

According to another aspect of the present invention, the portions are joined to one another by a plurality of seams different from one another.

According to another aspect of the present invention, the portions are joined to one another by means of a single seam, having variable arrangement as a function of the distance from the braking element. For example, the pattern defined by the seam becomes thicker as the distance from the braking element increases.

According to another aspect of the present invention, the folded section crosses the braking element, by means of an intermediate passage between the passages for the mentioned first and second free portions.

According to another aspect of the present invention, the braking element comprises a body provided with the mentioned passages, and the free sections of the sling cross the body alternately through said passages.

In other terms, a free section of the sling is consecutively inserted inside two passages such that, through a passage, the free section crosses the body from a first surface to a second surface and, through the subsequent passage, the free section crosses the body in the opposite direction, from the second surface to the first surface.

According to another aspect of the present invention, the first free section crosses a number of passages equal to the number of passages crossed by the second free portion. Preferably, the braking element has a symmetry plane, which divides the same element in two parts, and a first part has the passages for the first free section, while the second part has the passages for the second free section. In case the braking element is provided with an intermediate passage for the folded section of the sling, typically this symmetry plane substantially cuts such an intermediate passage in half.

According to another aspect of the present invention, the braking element comprises a body, preferably an elongated body, provided with through-openings to define said passages. In other words, according to an aspect of the present invention the passages for the sling of the braking element can be implemented by openings obtained in the body of the braking element.

According to another aspect of the present invention, such a body has reduced thickness compared to the other two dimensions, so that a plate is defined.

According to another aspect of the present invention, the braking element comprises two overlapped plates provided with openings to define the mentioned passages.

According to another aspect of the present invention, the sling crosses the passages by an angle between +60 and −60 degrees with respect to a plane perpendicular to the side surfaces of the body of the braking element. More in detail, such an angle is null when the sling crosses the passages so that the sling is substantially parallel to the mentioned plane, such an angle takes positive values when the sling does not invert its own orientation (considering the longitudinal direction with respect to the body of the braking element) while crossing the passages, whereas it takes negative values when on the contrary the sling inverts its own orientation while crossing the passages. In other terms, such an angle is positive when the sling takes a substantially V-shaped course, is substantially null when the sling takes a substantially U-shaped course (for example shown in FIG. 8), is negative when the sling takes a Ω-shaped course (for example shown in FIGS. 7A-7B), between two subsequent openings.

According to another aspect of the present invention, at least one intermediate element is arranged between the plates, said intermediate element being in turn provided with openings to define said passages.

BRIEF DESCRIPTION OF THE FIGURES

Referring to the accompanying figures, exemplary and not limitative embodiments of the present invention are now presented, wherein:

FIG. 7A is a view of a variation of the embodiment of FIG. 1, and FIG. 7B is a magnification of a detail of FIG. 7A;

DETAILED DESCRIPTION OF SOME EMBODIMENTS OF THE PRESENT INVENTION

Referring to figures, a device 1 according to an embodiment of the present invention comprises a sling 2 and a braking element 3.

Figure 4:
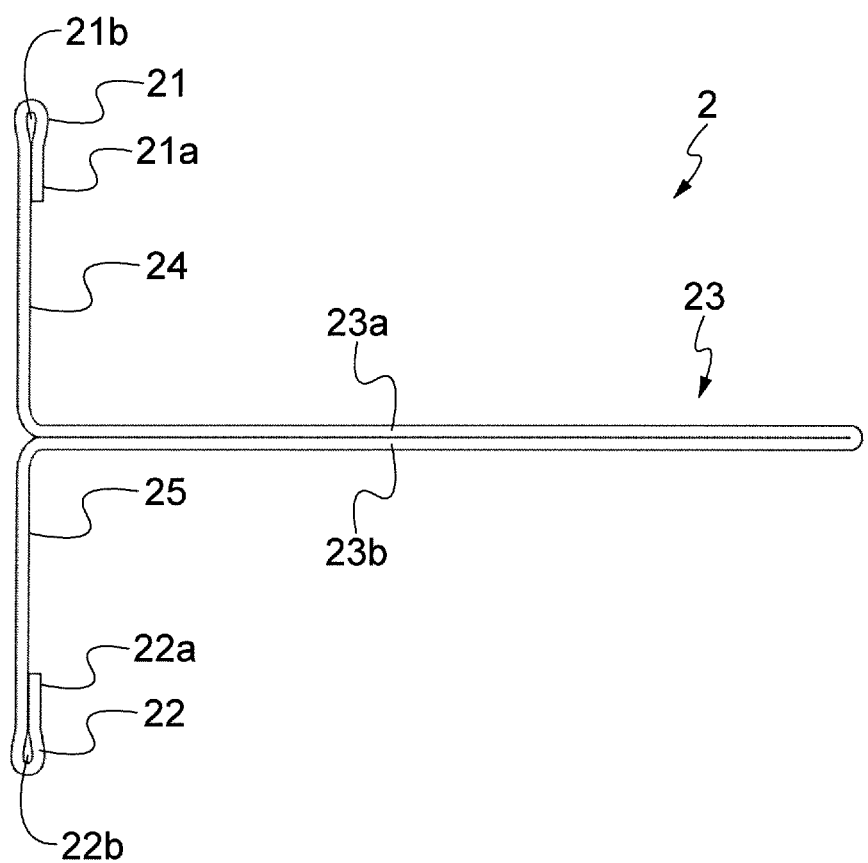
FIG. 4 is a side view of the sling of the device of FIG. 1.

Referring specifically to FIG. 4, the sling 2 (shown unconstrained from the braking element 3) comprises a first end 21 and a second end 22 opposed to the first end 21.

The first end 21 is constrainable to a support point, for example an anchoring point, preferably static or however little dynamic, whereas the second end 22 is constrainable to a load not shown in figures.

The load can consist for example of a person, which can be constrained to the end 22 of the sling by proper connecting means, such as for example connectors, karabiners, rings and the like suitable to be connected to a harness, or a belt of the person.

According to a possible embodiment, the ends 21, 22 comprise a portion 21a, 22a preferably folded and joined in known manner to the sling 2, so as to preferably form eyelets 21b, 22b which can serve as latch for an outer connecting element.

Between the two ends 21, 22, the sling 2 comprises a folded section 23. More specifically the folded section 23 is formed by two portions 23a, 23b of the sling 2 reversibly joined to one another.

As better explained in the following, the first portion 23a and the second portion 23b are joined to one another and have a given resistance to the separation.

In other terms, when a force is applied to the sling 2, and in particular a traction force FT which tends to move away the ends 21, 22 from one another, the resistance to the separation of the portions 23a and 23b of the folded section 23 counters such a traction force FT.

As above mentioned, such a force FT applied to the sling 2 is "reduced" when it reaches the folded section due to the amplified braking generated by the combined and synergistic action of the mentioned resistance to the separation of the portions 23a and 23b and the friction coefficient of the braking element.

If such a reduced traction force FR, applied to the sling 2 at the portions 23a, 23b, is smaller than the resistance to the separation of the same portions 23a and 23b, these remain joined to one another. If, on the contrary, the reduced traction force FR is larger than the resistance to the separation of the portions 23a and 23b, these separate and allow the ends 21, 22 of the sling 2 moving away from one another.

Between the first portion 23a of the folded section 23 and the first end 21, the sling 2 has a first free portion 24. Such a portion is called "free" since it is not constrained to other portions of the sling 2.

Similarly, a second free portion 25 is arranged between the second portion 23b of the folded section 23 and the second end 22 of the sling 2.

Figure 6A:
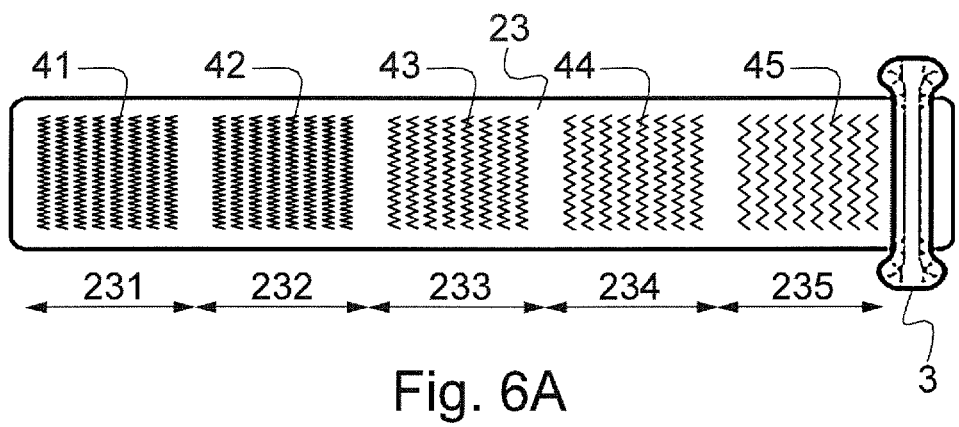
FIGS. 6A-6C show three possible embodiments of the folded section of a sling of a device of the present invention.
Figure 6B:
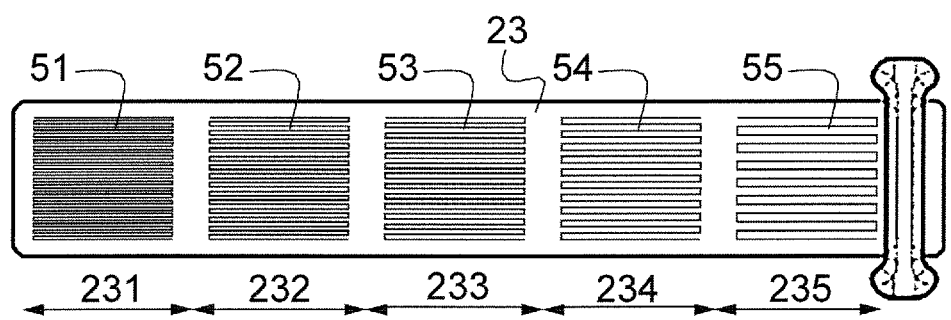
Figure 6C:
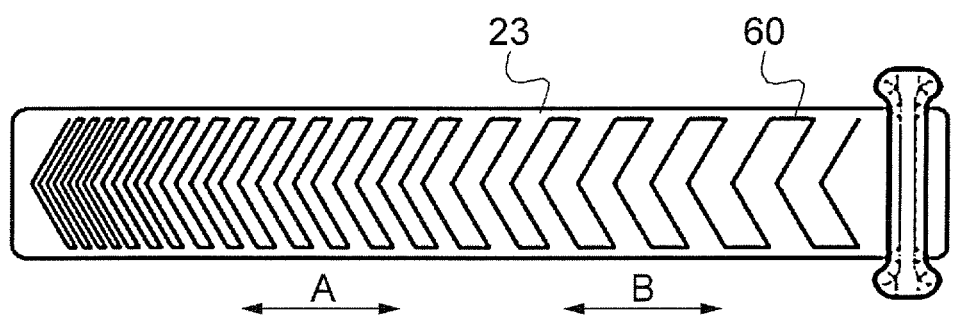
Figure 8:
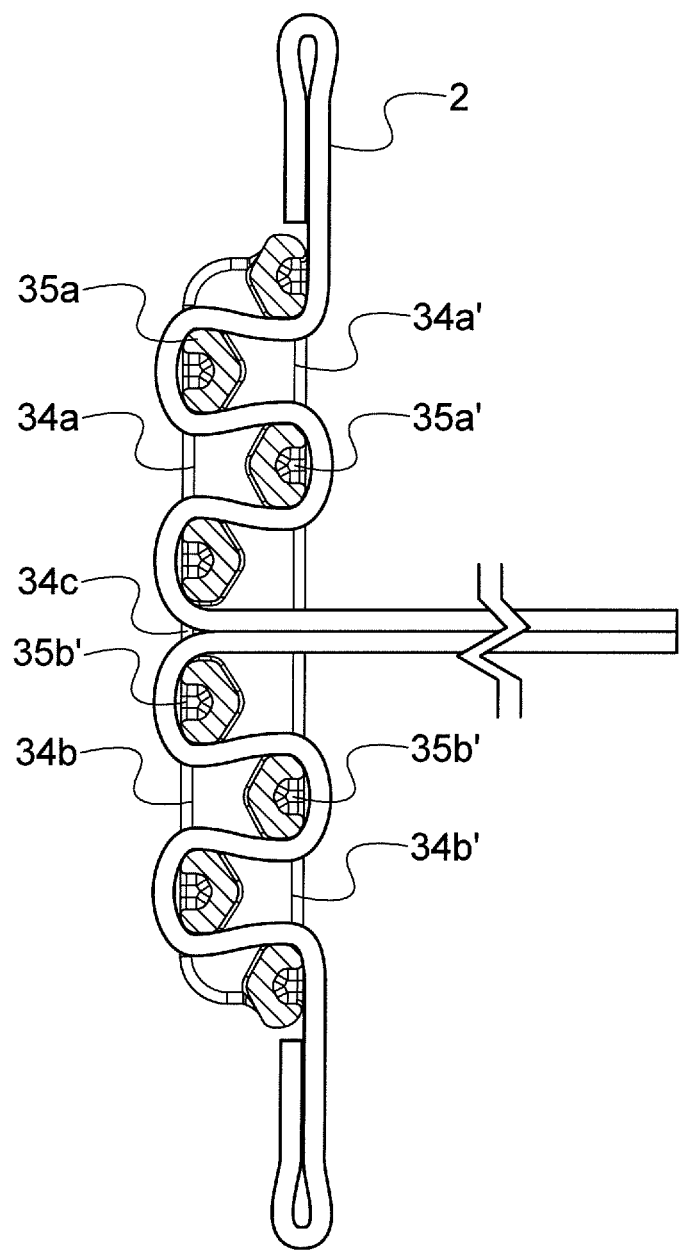
FIG. 8 is a view of a variation of the embodiment of FIG. 7.

Referring specifically to FIGS. 6A-6C, possible methods for joining the portions 23a and 23b of the folded portion 23 are now discussed.

In particular, in FIGS. 6A-6C, the portions 23a and 23b are joined by means of seams. The seams are arranged so as to form sectors 231, 232, 233, 234, 235, A, B of the folded section 23, which have resistances to the separation of the portions 23a, 23b different from one another.

Typically, the sectors 231, 232, 233, 234, 235, A, B provide resistance to the separation of the portions 23a, 23b increasing as a function of the distance from the braking element 3 (or however from the ends 21, 22 of the sling 2), such that the progressive separation of the sectors 231, 232, 233, 234, 235, A, B requires preferably increasing energy.

More specifically, in the embodiment shown in FIG. 6A each sector 231, 232, 233, 234, 235 has a set of seams 41, 42, 43, 44, 45.

The seams of a sector are different from the seams of at least another sector. In particular, according to a possible embodiment such as for example shown in the accompanying figures, the sets of seams 41, 42, 43, 44, 45 are arranged with different density inside the respective sector 231, 232, 233, 234, 235.

In an alternative embodiment, for example as shown in FIG. 6B, each sector 231, 232, 233, 234, 235 comprises a single seam 51, 52, 53, 54, 55 but arranged so as to differently occupy the space in each sector 231, 232, 233, 234, 235. More in detail, the seam of a sector occupies a surface different from the surface occupied by a seam of another sector.

In an additional alternative embodiment, for example shown in FIG. 6C, the portions 23a, 23b are joined by a single seam 60.

The seam 60 varies its own arrangement as a function of the distance from the braking element 3. In particular, the seam 60 has a pattern that becomes increasingly thick as the distance from the braking element 3 increases.

Differently from the previous implementations, sectors separated from one another are not sharply detectable. Generally, taking into account two sectors A, B having coincident size, randomly selected and placed at different distances from the braking element 3, such sectors A and B have resistances to the separation of the portions 23a, 23b different from one another.

The three shown embodiments are to be considered as three possible solutions in order to achieve a variable resistance to the separation of the portions 23a, 23b. Other arrangements, not shown, are possible, such as for example the implementation of seams having different shape and density, with both increasing and decreasing resistance of the seams. As an additional example, the portions 23a, 23b could be joined to one another by means of adhesion by gluing or by means of micro hooks, for example of Velcro type.

Furthermore, according to some possible embodiments the portions 23a, 23b are joined to one another with constant resistance to the separation as a function of the distance from the braking element 3, or however of the distance from the ends 21, 22. In other words, in alternative embodiments not shown, the folded section 23 comprises a single sector.

The device 1 further comprises a braking element 3 adapted to be engaged with the sling 2, such that the friction caused by the sling 2 sliding and contacting the braking element 3 interferes with the same sliding.

Figures 5A, 5B:
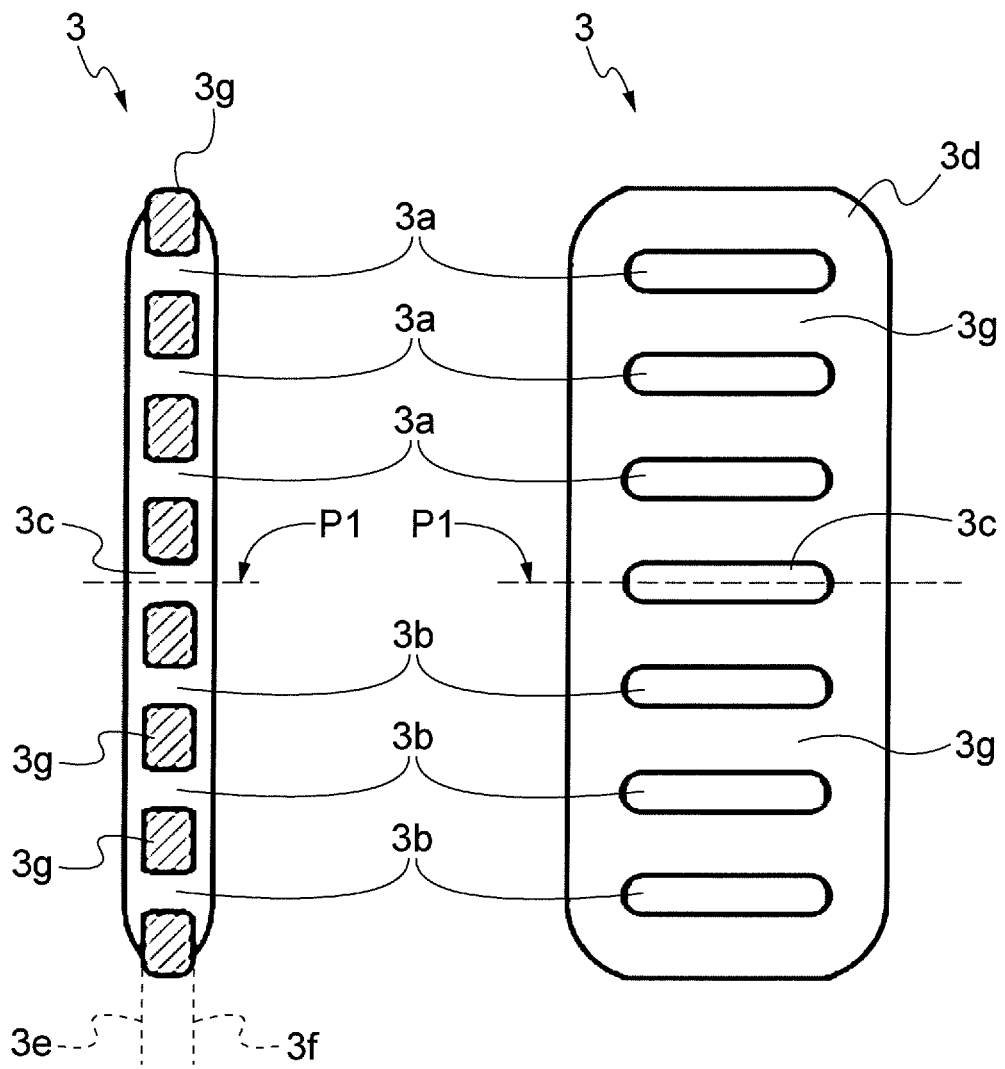
FIGS. 5A and 5B respectively show a side view and a front view of the braking element of the device of FIG. 1.

In particular, the braking element 3 (which can be seen in detail in FIGS. 5A and 5B) is provided with a plurality of passages 3a, 3b for the sling 2.

Figure 1:
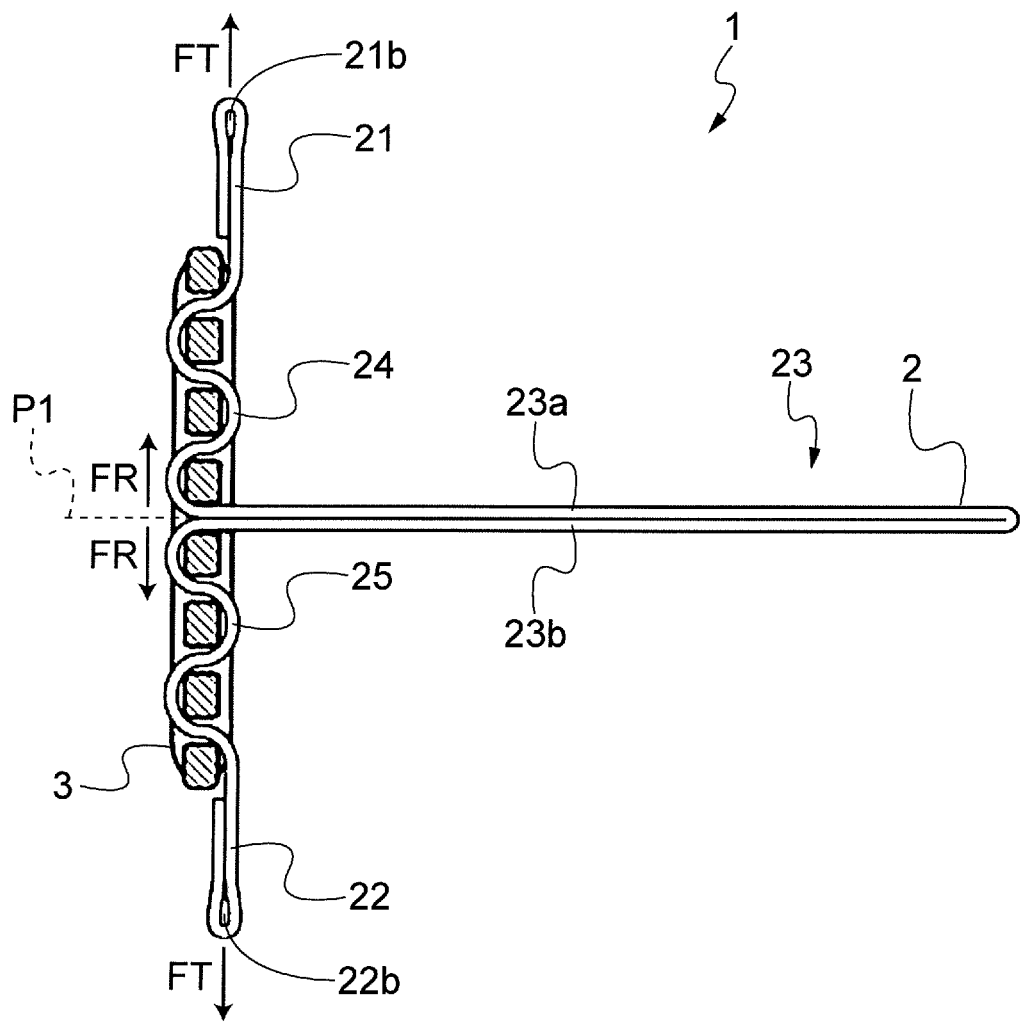
FIG. 1 is a side sectional view of an embodiment of a device according to the present invention.
Figure 2:
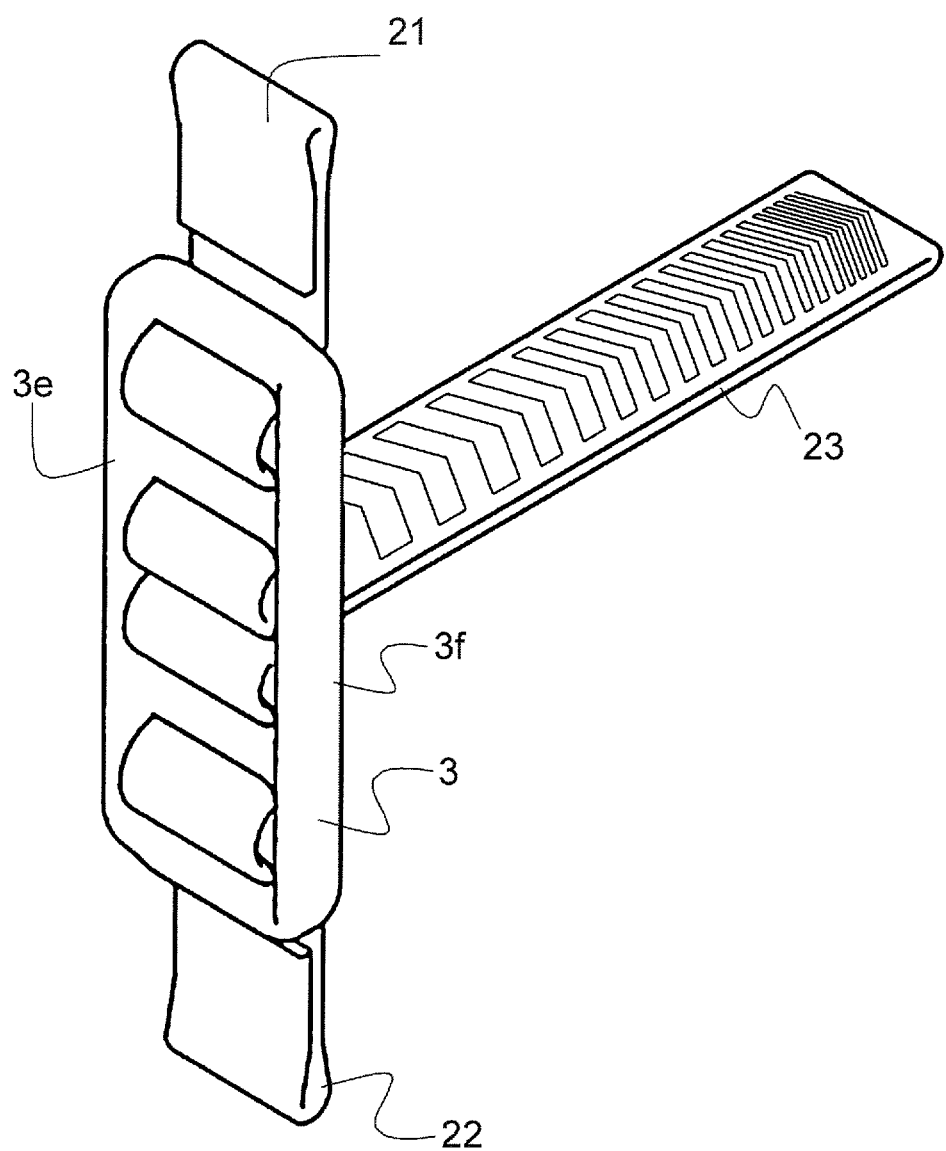
FIG. 2 is a perspective view of the device of FIG. 1.
Figure 3:
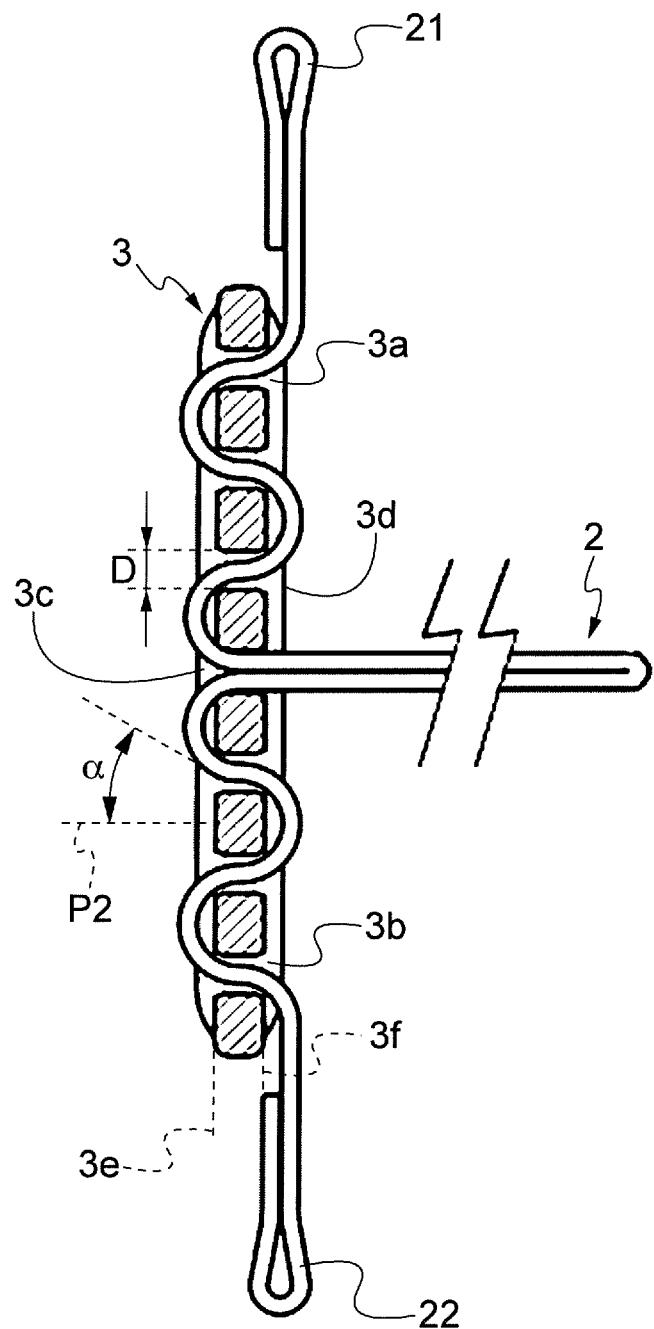
FIG. 3 is an enlarged and cut away view of FIG. 1.

Referring specifically to FIG. 3, the sling 2 is inserted inside the passages 3a, 3b such that the first free section 24 crosses a first set of passages 3a, and the second free section 25 crosses a second set of passages 3b.

Each set of passages 3a, 3b comprises one or, preferably, several passages 3a, 3b. In the embodiment shown, the sets of passages 3a, 3b have a number of passages equal to one another. However embodiments wherein the sets of passages 3a, 3b, each set being intended for one of the free portions 24, 25 of the sling 2, have a number of passages different from one another, can be provided.

Preferably, the folded section 23 is in turn inserted inside an intermediate passage 3c. Generally, the sling 2 is inserted inside the passages 3a, 3b (and possibly 3c) such that the friction caused by the contact between the sling 2 and the braking element 3 counters a traction force FT applied to the two ends 21, 22 of the sling 2.

In the embodiment shown in the figures, the braking element 3 has a body 3d provided with openings adapted to define the passages 3a, 3b (and possibly the intermediate passage 3c) and the sling 2 is inserted inside such openings such that the free portions 24, 25 cross the body 3d of the braking element 3 alternately.

In other words, by considering the braking element 3 in planar view, the free portions 24, 25 are alternately arranged, above and underneath the body 3d of the braking element.

Typically, the passages 3a, 3b and thus the openings for the sling passage, are defined by a set of pegs 3g, or similar elements, defining at least part of the edges of the passages (openings) 3a, 3b. According to a possible embodiment shown in FIGS. 1-5, the pegs are aligned to one another. In other words, the braking element 3 typically has a set of pegs 3g arranged in series and at a distance from one another. The space between consecutive pegs defines the mentioned passages.

When a free portion 24 or 25 crosses a passage 3a or 3b, this portion crosses the body 3d of the braking element from a first side surface 3e to a second side surface 3f. On the contrary at the subsequent passage 3a or 3b, the free portion 24 or 25 crosses the body 3d of the braking element 3 in opposite direction, i.e. from the second surface 3f to the first surface 3e.

In other words, the body 3d has two side surfaces 3e, 3f opposed to one another. It has to be noted that in the accompanying FIGS. 3, 5A, the side surfaces 3e, 3f of the body 3d have been schematically illustrated by two dashed lines.

The passages 3a, 3b cross the body 3 from the first side surface 3e to the second side surface 3f. Preferably, the sling 2 crosses the openings 3a, 3b by an angle $\alpha$ between +60 and −60 degrees, measured with respect to a plane P2 perpendicular to the side surfaces 3e, 3f of the body 3d. As mentioned, the sign of the angle (i.e. the evaluation which determines if the angle is positive or negative) is a function of the course of the sling inside the respective passage. Typically, the sling orientation depends on the distance between two consecutive pegs. If the distance D is larger than the sling thickness (as in FIG. 3) the angle $\alpha$ is generally positive. On the contrary if, as in FIG. 7B, the distance is smaller than the sling thickness (in that case the distance is substantially equal to zero), the angle α is generally negative.

Furthermore, the braking element 3 has an opening adapted to define an intermediate passage 3c, in order to allow the insertion of the folded section 23 of the sling 2 through the braking element 3.

The openings of the braking element, in the embodiment shown, are substantially identical to one another but could also exhibit different shapes; furthermore, in the shown figure, the openings are equally spaced from one another, although embodiments wherein the distance among the various openings is not constant, i.e. it varies among different subsequent pairs of openings, are not excluded.

In the embodiment of the figures, the braking element 3 is provided with a symmetry plane P1, which divides the passages 3a from the second passages 3b intended for the first and second free sections 24 and 25, respectively.

In case there is an intermediate passage 3c in order to allow the folded section 23 crossing the braking element 3, the symmetry plane P1 cuts such an intermediate passage. According to a possible embodiment, as for example visible in FIGS. 1-6, the braking element has an elongated body with reduced thickness with respect to its own other dimensions. In other words, the braking element is plate shaped.

In an alternative embodiment, for example shown in FIGS. 7A and 7B, the braking element 30 comprises two plates 31, 32 positioned side by side and provided with openings 31a, 31b, 31c, 32a, 32b, 32c facing one another so as to implement the mentioned passages for the sling 2.

The openings of the two plates 31, 32 are offset from one another, in order to fold the sling 2 so as to reverse the forward direction of the sling with respect to the development of the braking element 30 in longitudinal direction. Thus, preferably the angle α (shown in FIG. 7B) takes null or negative values, preferably comprised between 0 and −60 degrees.

Typically, according to a possible embodiment, the two plates 31, 32 have pegs 31g, 32g arranged so as to form openings 31a, 32a offset from one another, such that a peg 31g of the first plate 31 is facing a corresponding opening 32a of the second plate 32.

At least one intermediate element 33 is interposed between the plates 31, 32. Such an intermediate element is in turn provided with openings 33a, 33b, 33c for the sling 2.

Such an intermediate element can be used for spacing the plates 31, 32 apart and allowing a more effective dispersion of the heat generated by the friction of the sling 2 on the braking plates 31, 32, during the fall. For example, the plates 31, 32 can be made of metal in order to ensure the required sturdiness of the braking element, whereas the intermediate element 33 can be made of plastic, for the afore mentioned purposes. In alternative embodiments, not shown, the intermediate element can be missing. In alternative embodiments, not shown, the braking plates 31, 32 and the intermediate element 33 can be made in a single piece.

Furthermore, in an alternative embodiment a single plate 34 can have passages 34a, 34a', 34b, 34b', 34c offset from one another, so as to form a pathway for the sling 2 similar to that of the embodiment of FIG. 7. More specifically, the first set of passages 34a, 34a' is implemented by means of pegs 35a, 35a' which are alternatively arranged along two parallel planes. Similarly, the second set of passages 34b, 34b' is implemented by means of pegs 35b, 35b' which are alternatively arranged along two parallel planes (preferably coincident to the two planes along which the pegs 35a, 35a' forming the first set of passages 34a, 34a' are alternately arranged).

Generally, the sling 2 is inserted within the passages 3a, 3b of the braking element 3 such that, when a traction force FT higher than a threshold value is applied, i.e. a force FT such that the respective reduced force FR is enough to separate the portions 23a, 23b, the first portion 23a slides inside the first set of passages (or the passage) 3a and, similarly, the second portion 23b slides inside the second set of passages 3b.

The force FT is equal to the threshold value when the respective reduced force is equal to the resistance to the separation of the portions 23a, 23b of the sling.

As mentioned, thanks to the present invention the braking effect of the friction between the sling 2 and the braking element 3 can be amplified so as to generate a synergistic effect of the resistance to the separation of the sling folded portion, provided for example by the at least one seam, and the friction generated during the sliding of the sling inside the braking element 3.

The experiments carried out during the development of the invention highlighted that, for example, a sling with sectors 231, 232, 233, 234, 235 with seams that can be teared at about 0.65 kN, 0.9 kN, 1.5 kN and 1.8 kN, the sling being combined with a braking element able to develop under normal conditions (i.e. with the simple sliding of a sling with the folded portion 23 free from seams, gluing or other elements, able to resist to friction forces equal to about 0.25 kN), is able to develop amplified braking forces respectively of about 3.5 kN, 4.5 kN, 5.5 kN and 6 kN.

Figure 9C:
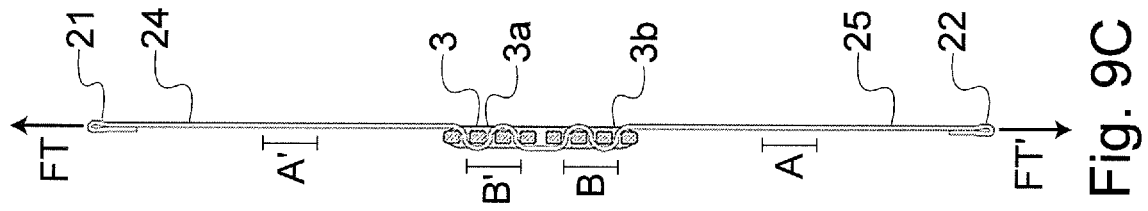
FIGS. 9A-9C show three consecutive steps of use of the device of FIG. 1.
Figure 9B:
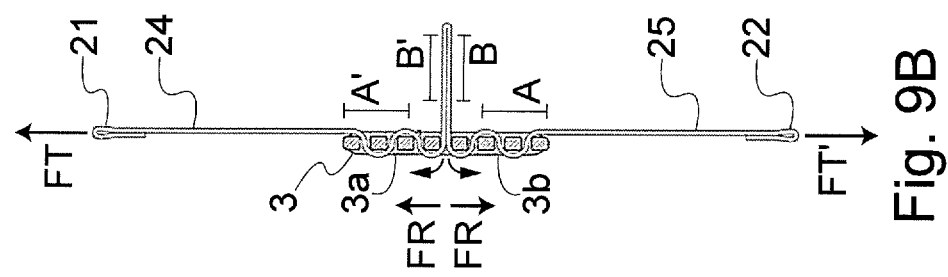
Figure 9A:
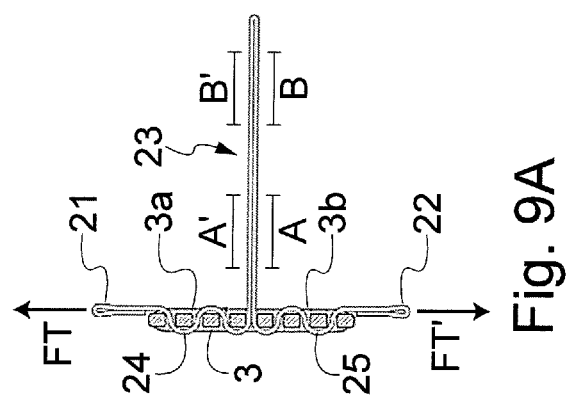

Referring specifically to FIGS. 9A-9C in use, in idle condition the device 1 is arranged as in FIG. 9A.

More in detail, the free portions 24, 25 of the sling 2 contact the braking element 3, and the folded section 23 has the portions 23a, 23b joined to one another.

Then, the fall of the load, such as for example a person, applies a traction force FT on the end 21 of the sling 2. Similarly, the support point applies a traction FT' to the other end 22 of the sling 2.

To simplify the description, it is shown an embodiment wherein the folded section 23 is provided with two sectors A,A' and B,B' with resistances to the separation different from one another. The following description applies mutatis mutandis also to embodiments with a different number of sectors (also a single sector).

The free portions 24, 25 slide inside the passages 3a, 3b of the braking element until the sector A, A' reaches the braking element 3. Simultaneously, the friction generated by the sliding of the free portions 24, 25 against the braking element 3 brakes the movement of the same free portions. When the sector A, A' reaches the braking element 3, the braking action is generated by the combined, synergistic and amplified action of the mentioned resistance to the separation of the portions 23a and 23b and the friction of the braking element 3.

Then, if the reduced force FR coming to the folded section 23 is lower than the value of the resistance to the separation of the sector A, A', i.e. in case the force FT is lower than the mentioned threshold value, the folded section 23 remains intact and the device 1 interrupts the movement of the sling 2.

If the force FT is higher than the threshold value, and thus the reduced force FR is higher than the resistance to the separation of the sector A, A', the portions 23a, 23b separate at such a sector. Such a condition is shown in FIG. 9B. The sector A, A' thus separates such that the portions 23a, 23b are each partially inserted in a set of passages 3a, 3b of the braking element.

In detail, the first portion 23a crosses the first set of passages 3a, while the second portion 23b crosses the second set of passages 3b.

The resistance of the sector A, A', which provides a resistance to the separation, causes a variation in the strain state of the portions 24, 25 whereby, given the friction coefficient between the same sling and the braking element 3, the braking action of the device 1 is remarkably amplified and counters the traction force FT.

The point of separation of the portions 23a and 23b, i.e. the point wherein the two portions 23a, 23b of the folded section 23 separate typically by breakage of the respective seam (or seams), is preferably placed at the intermediate passage 3c. More generally, such a separation point is generally placed substantially at the braking element 3.

Then, if the reduced force FR is lower than the value of the resistance to the separation of the sector B, B', such a sector remains intact and the device 1 interrupts the movement of the sling 2.

Alternatively, if the reduced force FR is on the contrary higher than the resistance to the separation of the sector B, B', the portions 23a, 23b separate completely and cross the braking element, as shown in FIG. 9C.

In particular, in the embodiment shown, the entire folded section crosses the braking body 3 from a first side surface 3e to a second side surface 3f, through the intermediate passage 3c.

It has been therefore highlighted how the device 1 generates, when subjected to a traction force FT applied to the two ends 21, 22, an opposition force given by the combined and synergistic action of a resistance to the separation, which is given by the joined portions 23a, 23b and the friction coefficient between the sling 2 and the braking element 3.

Such a synergy provides an effect of amplification of the resistance to the separation of the joined portions 23a, 23b, which allows to produce absorbers which are particularly effective, conveniently adjustable, gradual and regular during the braking event, especially in case they have to operate for dissipating the energy generated by falls of loads or people with significantly different weight. The effect further allows to produce absorbers which are less complex and mostly limited in size and weight.

The invention claimed is:

1. Device (1), comprising a sling (2) and a braking element (3, 30), said sling (2) comprising:
   a first end (21) constrainable to an anchoring point;
   a second end (22) constrainable to said load;
   a folded section (23) comprising a first portion (23a) of said sling (2) reversibly joined to a second portion (23b) of said sling (2), wherein said folded section (23) provides a resistance to separate said first and second portions (23a, 23b);
   a first free section (24) comprised between said first portion (23a) of said folded section (23) and said first end (21);
   a second free section (25) comprised between said second portion (23b) of said folded section (23) and said second end (22);
   and wherein said braking element (3, 30) comprises a plurality of passages for said sling (2), wherein said first free section (24) crosses at least one first passage (3a), wherein said second free section (25) crosses at least one second passage (3b) so that said first portion (23a), as a consequence of apply a traction force (FT, FT') higher than a threshold value to at least one of said two ends (21, 22), separates from said second portion (23b) and crosses said first passage (3a), and said second portion (23b) crosses said second passage (3b).

2. Device (1) according to claim 1, wherein said folded section (23) comprises a plurality of sectors (231, 232, 233, 234, 235, A, B), wherein said portions (23a, 23b) are reversibly joined to one another, preferably said sectors (231, 232, 233, 234, 235, A, B) and provides a resistance to separation different from one another.

3. Device (1) according to claim 1, wherein said portions (23a, 23b) of said folded section (23) are joined to one another by at least one seam (41, 42, 43, 44, 45, 51, 52, 53, 54, 55, 60).

4. Device (1) according to claim 3, wherein said portions (23a, 23b) are joined to one another by a plurality of seams (41, 42, 43, 44, 45, 51, 52, 53, 54, 55), said seams (41, 42, 43, 44, 45, 51, 52, 53, 54, 55) being different from one another.

5. Device (1) according to claim 3, wherein said portions (23a, 23b) are joined to one another by a single seam (60), said seam (60) having variable arrangement as a function of a distance from said braking element (3, 30).

6. Device (1) according to claim 1, wherein said folded section (23) crosses said braking element (3, 30), by means of an intermediate passage (3c), arranged between said at least one first passage (3a) and said at least one second passage (3b).

7. Device (1) according to claim 1, wherein said first free section (24) crosses a number of passages equal to the number of passages that said second free section (25) crosses.

8. Device (1) according to claim 1, wherein said braking element (3, 30) comprises an elongated body (3d) provided with through-openings to define said passages (3a, 3b).

9. Device (1) according to claim 8, wherein thickness of said body (3d) is smaller than the other two dimensions of said body (3d), so that a plate is defined.

10. Device (1) according to claim 1, wherein said braking element (30) comprises two overlapped plates (31, 32) provided with openings (31a, 31b, 31c, 32a, 32b, 32c) to define said passages.

11. Device (1) according to claim 10, wherein an intermediate element (33) is placed between said plates, said intermediate element (33) being in turn provided with openings (33a, 33b, 33c) to define said passages.

12. Device (1) according to claim 1, wherein said braking element (3, 30) comprises a body (3d) provided with said passages (3a, 3b, 3c), and said free sections (24, 25) of said sling (2) cross said body (3d) Alternately Through said passages.

13. Device (1) according to claim 12, wherein said body (3d) has a symmetry plane (P1) dividing said body (3d) in two parts, a first part having said at least one first passage (3a), and said second part having said at least one second passage (3b).

14. Device (1) according to claim 13, wherein said symmetry plane (P1) divides said intermediate passage (3c) in half.

15. Device (1) according to claim 12, wherein said sling (2) crosses said passages (3a) by an angle (a) comprised between +60 and −60 degrees with respect to a plane (P2) perpendicular to the side surfaces (3e, 3f) of the body (3d) of the braking element.

* * * * *